(12) United States Patent
Morita et al.

(10) Patent No.: US 8,204,282 B2
(45) Date of Patent: Jun. 19, 2012

(54) IMAGE INPUT DEVICE AND PERSONAL AUTHENTICATION DEVICE

(75) Inventors: Nobuhiro Morita, Kanagawa (JP); Yuji Yamanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 951 days.

(21) Appl. No.: 12/208,917

(22) Filed: Sep. 11, 2008

(65) Prior Publication Data

US 2009/0074316 A1  Mar. 19, 2009

(30) Foreign Application Priority Data

Sep. 14, 2007 (JP) ................................. 2007-239581
Aug. 19, 2008 (JP) ................................. 2008-211087

(51) Int. Cl.
*G06K 9/00* (2006.01)
*G06K 9/24* (2006.01)
*G06K 9/28* (2006.01)

(52) U.S. Cl. ........ 382/124; 382/115; 382/125; 382/126; 382/284; 349/95

(58) Field of Classification Search .................. 382/124, 382/115, 125, 126, 284; 349/95
See application file for complete search history.

(56) References Cited

U.S. PATENT DOCUMENTS

| | | | | |
|---|---|---|---|---|
| 6,934,089 B1 * | 8/2005 | Kallo | ............................. | 359/663 |
| 7,260,247 B2 * | 8/2007 | Kita | ................................ | 382/126 |
| 7,706,070 B2 * | 4/2010 | Yamamura | ..................... | 359/619 |
| 2004/0202354 A1 | 10/2004 | Togino | | |
| 2008/0031497 A1 * | 2/2008 | Kishigami et al. | ............. | 382/115 |
| 2008/0075330 A1 * | 3/2008 | Matsumura et al. | .......... | 382/115 |
| 2008/0088731 A1 * | 4/2008 | Tanaka et al. | .................. | 348/340 |
| 2008/0142686 A1 * | 6/2008 | Konno et al. | ............... | 250/208.1 |

FOREIGN PATENT DOCUMENTS

| | | |
|---|---|---|
| JP | 2001-358904 | 12/2001 |
| JP | 2002-218160 | 8/2002 |
| JP | 2003-163938 A | 6/2003 |

(Continued)

OTHER PUBLICATIONS

Meister, Darryl. "Ophthalmic Lens Design (Accessed through Internet Archive)." OptiCampus.com—Continuing Education Course. OptiCampus.com, Oct. 24, 2006. Web. Dec. 4, 2011. <http://web.archive.org/web/20061024020214/http://www.opticampus.com/popcourse.php?url=lens_design/>.*

(Continued)

*Primary Examiner* — Michael A Newman
(74) *Attorney, Agent, or Firm* — Dickstein Shapiro LLP

(57) ABSTRACT

An image input device is disclosed, including: a lens array in which a plurality of lenses are arrayed; a shielding member configured to prevent a crosstalk on an image surface of light rays passing each of lenses of the lens array; a flat board member configured to regulate a position of a living body in a lens optical axis direction of the lens array when contacting the living body; an image pickup part configured to include an image surface and pick up a compound eye image, which is a set of reduced images of an object inside the living body which position is regulated by the flat board member, the reduced images approximately formed on the image surface by the plurality of lenses of the lens array; and a process part configured to re-compose a single image from the compound eye image picked up by the image pickup part. The image input device inputs the single image re-composed by the process part as an object image.

7 Claims, 6 Drawing Sheets

FOREIGN PATENT DOCUMENTS

| | | |
|---|---|---|
| JP | 2004-272821 | 9/2004 |
| JP | 2005-92375 | 4/2005 |
| JP | 3705766 | 8/2005 |
| JP | 3773563 | 2/2006 |
| JP | 2006-135823 A | 5/2006 |
| JP | 2007-304525 | 11/2007 |
| JP | 2008-97327 | 4/2008 |
| WO | WO 2006038276 A1 * | 4/2006 |

OTHER PUBLICATIONS

Kamal, et al. "Properties of Moire Magnifiers." Optical Engineering. 37.11 (1998): 3007-3014. Print.*

* cited by examiner

FIG.3A
FIG.3B
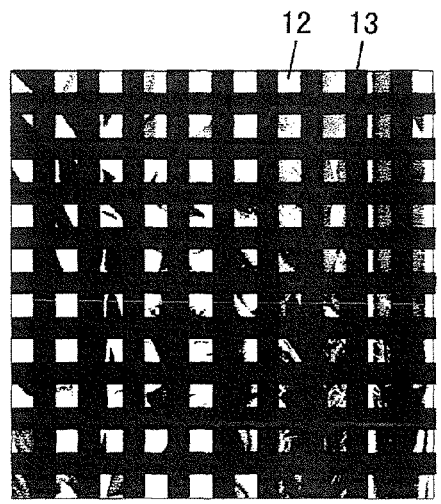

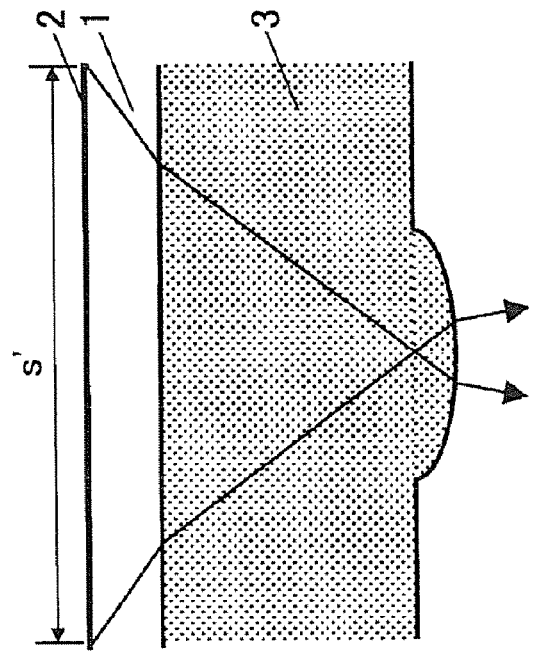
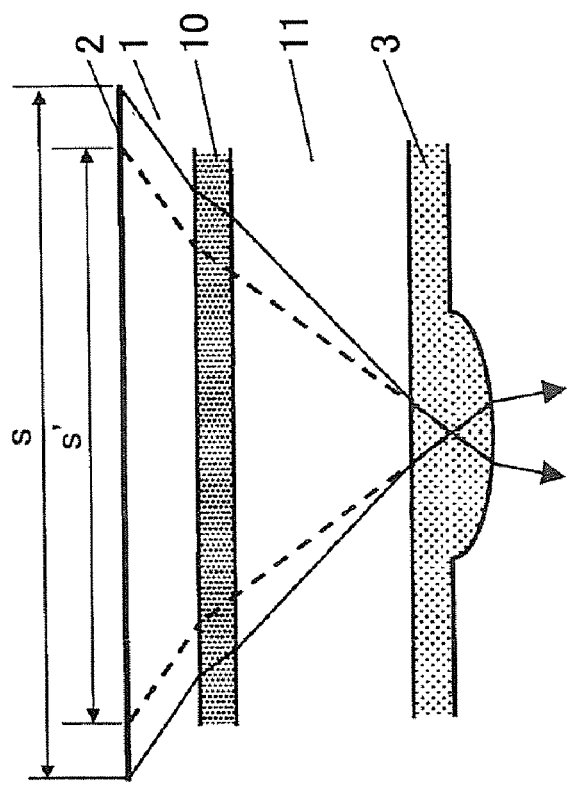

IMAGE INPUT DEVICE AND PERSONAL AUTHENTICATION DEVICE

BACKGROUND OF THE INVENTION

1. Field of the Invention

The present invention generally relates to a personal authentication device for conducting a personal authentication by using information concerning an object inside a living body and an image input device implementable as an object image input means of the personal authentication device.

2. Description of the Related Art

Recently, a personal authentication device has been mounted to a mobile phone, a notebook personal computer, other various information processing devices. In minimizing the information processing device, it is required to further minimize the personal authentication device to mount to the information processing device.

For example, Japanese Laid-open Patent Application Publications No. 2004-272821 and No. 2005-092375 disclose an personal authentication device using a vein pattern of a finger. The personal authentication device uses an optical system of a single eye, and limits an object distance and an image pickup distance to optically form an image. Accordingly, it is limited to further minimize a size and reduce a weight of the personal authentication device.

Moreover, Japanese Patent No. 3705766 discloses an image input device combining a micro lens array, a color filter, a photo acceptance unit array, and a like.

In a case of a personal authentication device using information concerning an object inside a finger such as the vein pattern of the finger, it is required to cohere the finger to the device. The image input device used for the personal authentication device has a particularity of picking up an image of the object being considerably closed.

In a case of using a finger print, necessary information of a finger print pattern can be acquired by picking up an image of a narrow area of the finger. On the other hand, in a case of using a finger vein, it is required to pick up an image of a wider area of the finger in order to acquire necessary vein pattern information. In order to observe an image of the object in a considerably closer state, an equi-magnification imaging with a micro lens array is generally used. However, if attempting to pick up an image of a wider area by using the equi-magnification imaging, an imaging device having a wider imaging surface is required and a device cost is increased. An imaging surface of a CMOS (Complementary Metal-Oxide-Semiconductor) imaging device or a CCD (Charge-Coupled Device) imaging device, which is generally used and cheap, is limited. Accordingly, it is required to specially produce to obtain an imaging device having a wider imaging surface.

SUMMARY OF THE INVENTION

The present invention solves or reduces one or more of the above problems.

In aspect of this disclosure, there is provided an image input device, including: a lens array in which a plurality of lenses are arrayed; a shielding member configured to prevent a crosstalk on an image surface of light rays passing each of lenses of the lens array; a flat board member configured to regulate a position of a living body in a lens optical axis direction of the lens array when contacting the living body; an image pickup part configured to include an image surface and pick up a compound eye image, which is a set of reduced images of an object inside the living body which position is regulated by the flat board member, the reduced images approximately formed on the image surface by the plurality of lenses of the lens array; and a process part configured to re-compose a single image from the compound eye image picked up by the image pickup part, wherein the single image re-composed by the process part is input as an object image.

BRIEF DESCRIPTION OF THE DRAWINGS

In the following, embodiments of the present invention will be described with reference to the accompanying drawings.

FIG. 3A and FIG. 3B are diagrams for explaining a compound eye image of the object;

FIG. 4A and FIG. 4B are diagrams for explaining enlarging a view field due to an airspace between a flat board and a lens array;

DESCRIPTION OF THE PREFERRED EMBODIMENT

In the following, an embodiment of the present invention will be described with reference to the accompanying drawings. An image input device according to the present invention is preferably applied to input an image of an object inside a living body. In the embodiment of the present invention, the image input device is described as a device which picks up an image of a blood vessel inside a finger as an object and uses an input image for a personal authentication.

Figure 1:
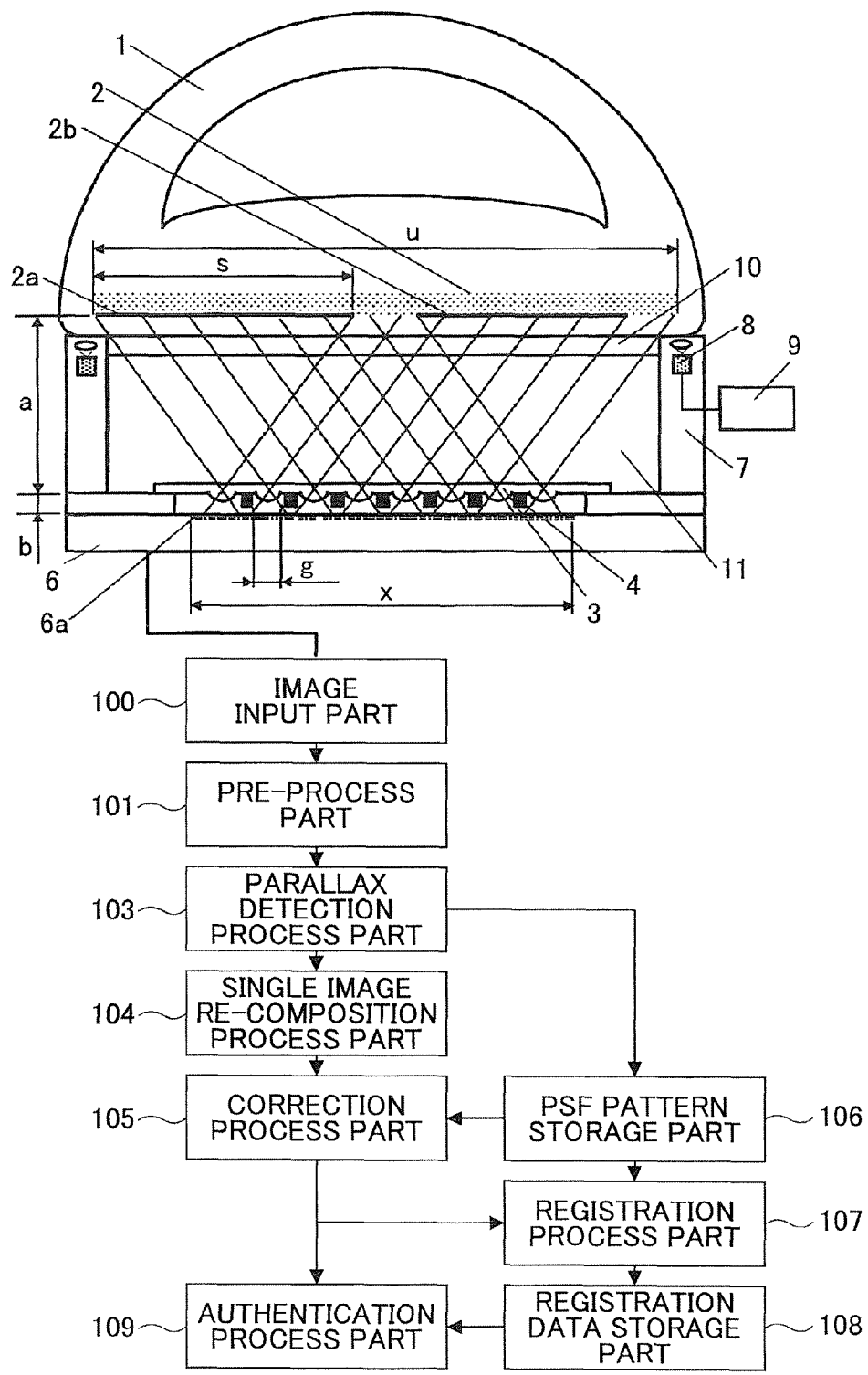
FIG. 1 is a diagram illustrating a configuration of an image input device according to an embodiment of the present invention.

FIG. 1 is a diagram illustrating a configuration of an image input device according to the embodiment of the present invention. In FIG. 1, a finger 1 of a person is schematically depicted in a view of a fingertip direction, and a blood vessel 2 inside the finger 1 is schematically depicted. The blood vessel 2 is an object.

A lens array 3 forms an image of the object, and a plurality of aspheric single lenses are arrayed in a two dimension in a plane approximately being orthogonal to an optical axis. A spherical lens at one side or both sides or an aspheric lens at both sides may be used for each of lenses forming the lens array 3. Alternatively, a diffraction type of a lens such as a Fresnel lens can be used. A shielding member 4 prevents a crosstalk on an image surface of light rays passing through each lens of the lens array 3, and suppresses a noise light such as a ghost and flare.

An observation area 2a is an area which is observed by one lens of the lens array 3, and a shared area 2b is an area which is shared with lenses being adjacent to each other in the observation area 2a (the observation area 2a and the shared area 2b will be described later).

Figure 2:
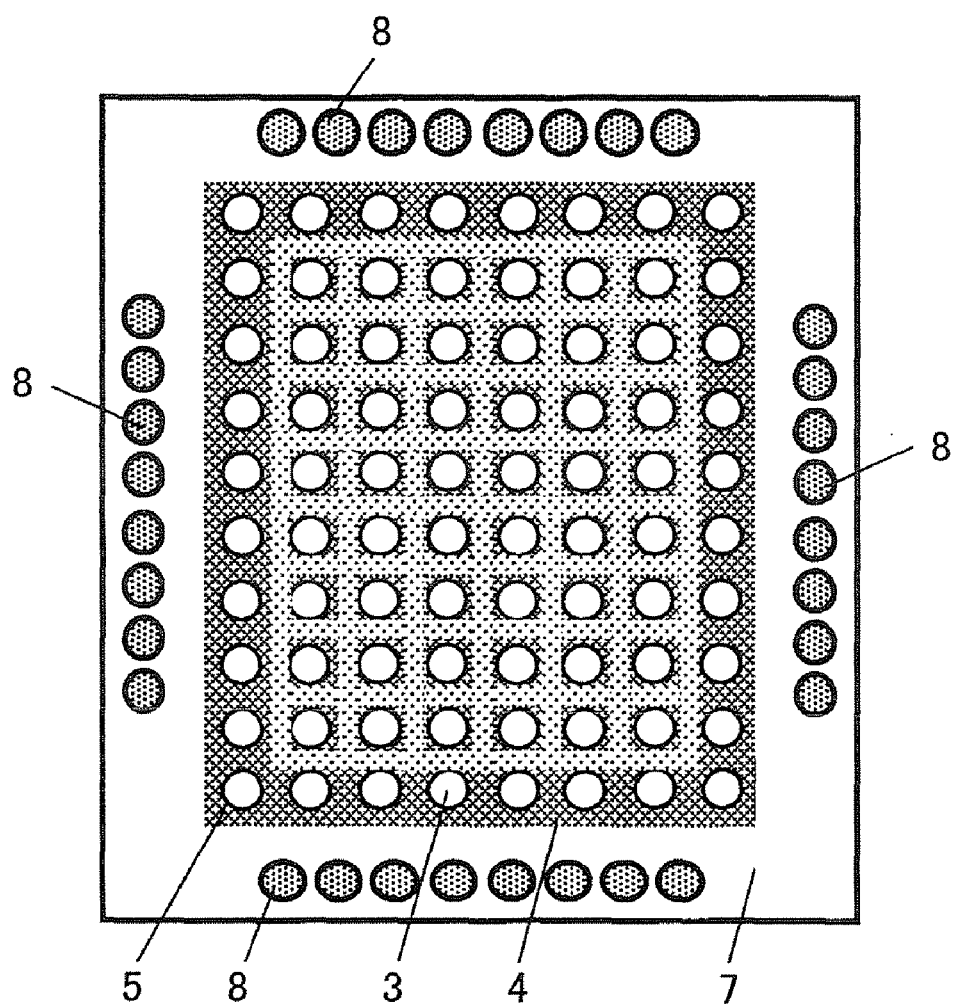
FIG. 2 is a diagram illustrating a view observed from above a flat board.

FIG. 2 is a diagram illustrating a view observed from the object. In FIG. 2, an imaging optical system including the lens array 3 and the shielding member 4 is illustrated in a view observed from the object. As illustrated in FIG. 2, the shielding member 4 is a flat plate on which rectangle apertures are formed. A length of one side of a rectangle aperture approximately corresponds to an effective diameter of each lens of the lens array 3, or is wider than a diameter of each lens. The rectangle aperture is extended to an image surface, and a size of the rectangle aperture is a size of an image (an ommatidium image) formed by one lens.

Since each lens of the lens array 3 is a circle, in order to prevent a light from the object from entering the image surface from a space between the effective area of the lens and the rectangle aperture, a film 5 is formed to reflect a incident light from a side of the object on a portion other than the effective diameter of the lens on a surface at an image pickup side of the lens array 3. The film 5 is formed by evaporating a metal membrane (for example, chrome thin film) onto the lens array 3, or by printing an opaque resin to the lens array 3. A flare light due to a cross-talk between adjacent lenses are eliminated by using the shielding member 4 and the film 5.

The lens array 3 is made by a processing method such as a reflow method, a are gradation mask method, and a polishing method, in which a transparent resin and glass are used as a material, or a molding method using a mold produced by either one of former methods.

The shielding member 4 is made by making apertures on the plane of a resin, a glass, a metal, or a like as a material by an etching, a drilling process, a laser process or a like. The etching and the laser process may restrict a height in a lens optical axis direction of the shielding member 4. In this case, another shielding member produced to be thinner is overlapped and adhered tot the shielding member 4 in the lens optical axis direction to ensure the height. By using an obscure material as a member of the shielding member 4 or coating a transparent member, it is possible to suppress transmission and reflection of a light.

An image pickup device 6 picks up a compound eye image of the object which is to be imaged by the lens array 3. Pixels 6a are arrayed in a two dimension. In this embodiment, a general CMOS (Complementary Metal-Oxide Semiconductor) image pickup device is used as the image pickup device 6. Alternatively, a CCD (Charge-Coupled Device) image pickup device or a like can be used as the image pickup device 6.

A cover glass may be provided with the CMOS image pickup device or the like to protect the image surface. In the embodiment, the cover glass is not provided with the image pickup device 6. An image pickup device with which the cover glass is provided can be used. In this case, considering an influence of refraction of the light on the cover glass, it is required to design a shape and a location of the lens array 3. Also, there is an image pickup device in which an optical low-pass filter is arranged near the image surface for an aliasing prevention. In the embodiment, the low-pass filter is not provided due to a super resolution process which will be described later.

In order to prevent a damage of the image surface by contacting the shielding member 4, the shielding member 4 is supported with the lens array 3 by a chassis 7 in a state of slightly floating from the image surface. In a case of protecting the image surface with a cover glass, the shielding member 4 may be arranged by contacting a surface of the cover glass.

In the configuration illustrated in FIG. 1, a space where the image surface of the image pickup device 6 exists is shielded by the lens array 3 and the chassis 7. Thus, it is possible to prevent dusts from externally entering and adhering to the image surface. Since the shielding member 4 slightly floats from the image surface, in order to prevent the crosstalk of a ray of light due to light passing through the space between a bottom surface of the shielding member 4 and the image surface, a pitch among lenses of the lens array 3 is defined in a surface of a parallel direction to the image surface.

In order to pick up a brilliant image of the object at a higher contrast, an LED (Light Emitting Diode) 8 is provided to emit light to a finger 1. As the LED 8, a means for emitting light of a waveform in the near infrared region having a low absorption rate with respect to a living body is used. Alternatively, a means for emitting light of a waveform having transmittance to a biological tissue such as a red zone can be used. In this embodiment, as illustrated in FIG. 2, a plurality of LEDs 8 are arranged by surrounding the lens array 3.

A driving part 9 drives the LED 8. The driving part 9 may be configured to control the LED 8 to emit and quench light by associating with ON and OFF of a power source of the image input device. This is not safety if the LED 8 always emits the light during the image input device is ON. Accordingly, it is preferable that a switch is provided to detect the finger 1, and the driving part 9 makes the LED 8 emit the light only during the switch detects the finger 1.

The finger 1 contacts a flat board 10 which regulates a position in the lens optical axis direction. In this embodiment, the flat board 10 is a transparent member made of a transparent resin material but is not limited to this material. At least, the flat board 10 is a flat board member which is made of material such as a glass, a resin, or a like having transmittance with respect to a near-infrared light and a like emitted to the finger 1. On a bottom surface of the flat board 10, that is, a surface at a side facing the image surface, an optical membrane acting as a band pass filter, which lets light in vicinity of a wavelength of the light emitted to the finger 1 pass, is evaporated. By this configuration, it is possible to pick up an object image by using only the light passing inside the finger 1, and acquires an image having a higher quality and a higher contrast.

In this embodiment, an airspace 11 intervenes between the flat board 10 and the lens array 3. As the airspace 11, a space filling another gas or liquid or a vacuum space may be formed. Alternatively, instead of forming the airspace 11, the flat board 10 may be coherent to the lens array 3. In a case of providing the airspace 11 between the flat board 10 and the lens array 3, an object distance is defined by a thickness of the flat board 10 being transparent, a thickness of the airspace 11, and a thickness of the lens array 3. The object distance is a distance from a main flat surface of each of the lenses forming the lens array 3 to the object. In a case of coherent the flat board 10 to the lens array 3, the object distance is defined by the thickness of the flat board 10 and the thickness of the lens array 3. The same material as the lens array 3 can be used for the flat board 10.

As illustrated in FIG. 1, the object distance is indicated by a distance "a" from an approximately main flat surface of each of the lenses forming the lens array 3, and an image surface distance is indicated by a distance "b" from the approximately main flat surface of each of the lenses forming the lens array 3 to the image surface. Thus, an optical magnification of the lenses is determined by a ratio of the distance "a" to the distance "b".

A person attempting to authenticate or a person attempting to register personal data contacts the flat board 10 and the chassis 7 with the finger 1. The near-infrared light emitted from the LED 8 is illuminated to the finger 1. The near-infrared light transmits and scatters inside the living body. It is known that the near-infrared light has transmittance with respect to the living body but is absorbed by reduced hemoglobin of blood. Accordingly, a blood vessel pattern image, in which a vessel is imaged as a black portion, is formed on the image surface of the image pickup device 6 as compound eye image by the lens array 3.

In FIG. 1, the light from the LED 8 is emitted to an overhead direction. Alternatively, in order to acquire the blood vessel pattern image having an adequate contrast, the light may be emitted toward a center of the finger 1 or toward a diagonal upward direction directing side surfaces of the finger 1. In order to effectively illuminate the light emitted from the LED 8 to the finger 1, a lens may be provided in a light path between the finger 1 and each LED 8.

Moreover, depending on a use environment of the image input device, it is not impossible to pick up an image by using an external light source without providing the LED 8 as a light source for illumination. However, by illuminating the near-infrared light by the LED 8, it is possible to pick up a brilliant blood vessel pattern image which a higher contrast, independent of the use environment of the image input device. Thus, it is preferable to provide the LED 8.

An aspect of forming a compound eye image on the image surface will be described with reference to FIG. 3A and FIG. 3B. For the sake of convenience, a portrait image illustrated in FIG. 3A is used as the object. Regarding the object, a compound eye image as illustrated in FIG. 3B is formed on the image surface. An ommatidium image 12 is an image which is picked up by each of the lens forming the lens array 3, and a plurality of ommatidium images 12 being the same count as the lenses collectively form the compound eye image. A shadow 13 is a shadow of the shielding member 4, and is an invalid area which does not contribute to reproduce a single image from the compound eye image.

Moreover, the observation area 2a for each of lenses of the lens array 3 is mutually displaced. Also, the shared area 2b occurs in a state of overlapping the observation areas 2 of adjacent lenses. A size "s" of the observation area 2a for each of lenses of the lens array 3, a displacement (parallax) Δ of the observation area 2a between the adjacent lenses, and a size "w" of the shared area 2b are determined by the following formulae (1) through (3) using a lens diameter "d", a distance "e" from a lens edge to a shielding wall, and a lens pitch p:

$$s = a \times (d + 2 \times e)/b \quad (1)$$

$$\Delta = a \times p/b \quad (2)$$

$$w = s - (p + 2 \times e) \quad (3)$$

When "u" denotes a size of an object to be imaged, "g" denotes a size of a rectangular aperture of the shielding member 4 (a length of one edge of a cross-sectional surface of the rectangular aperture in a surface approximately orthogonal to the lens optical axis), and "x" denotes a size of the image surface of the image pickup device 6, in the plurality of lenses forming the lens array 3, if an addition of a visual field of lenses corresponding to an outermost portion of the image surface and the image surface size "x" (an addition of half visual field of lenses positioning at the leftmost of the lens array 3 in FIG. 1, half visual field of lenses positioning at the rightmost of the lens array 3 in FIG. 1, and the image surface size "x") is greater than the object size "u", it is possible to pick up an image of an object being until the object size "u" by using the pickup image device 6 having the image surface which size is smaller than the object size "u". Accordingly, the rectangular aperture size "g" of the shielding member 4 and the image surface distance "b" are determined so as to satisfy the following formula (4) and ensures the object size "u" and the thickness of the image input apparatus which are required:

$$g \times a/b + x \geq u \quad (4)$$

In this embodiment, the image surface distance "b" is approximately defined by a height in the lens optical axis direction of the shielding member 4. The height is approximately corresponded to the image surface distance "b". In this case, it is not always required to satisfy an image formation relationship of lenses. A location (distance "a") of the flat board 10 and the height in the lens optical axis direction of the shielding member 4 are determined so as to define a position of the finger 1, based on the above formula (4), within a range in which a cutoff frequency of the lenses is not lower than a required frequency of the object. Since the image formation relationship is not always satisfied, a contrast of a picked-up image is degraded due to an increase of a wave aberration. As described later, it is possible to compensate by a filtering using a point spread function (PSF) of the lenses and an optical transfer function (OTF).

A skin of the finger 1 intervenes between the vessel to be the object and the lens array 3, and a thickness of the skin differs in individuals. Thus, the object distance "a" from the lens array 3 to the object varies. A relationship of the above formula (4) may be considered by assuming a case in that the optical magnification becomes higher since the object is the closest to the lens array 3.

A consideration regarding a lateral direction (a width direction of the finger 1) in FIG. 1 is described above, and another consideration regarding a depth direction (a length direction of the finger 1) will be described in the following. When a rectangular aperture size of the shielding member 4 is denoted by "g*h" (g, h: lengths respective to edges of the cross-sectional surface of the rectangular aperture within the surface approximately orthogonal to the lens optical axis), an image surface size of the image pickup device 6 is denoted by "x*y", and a size of the object to be imaged (a visual field size at an object position of the image input device) is denoted by "u*v", a location of the flat board 10, the rectangular aperture size "g*h", and the image surface distance "b" are determined, so as to satisfy the following formula (5) or (6):

$$g \times a/b + x \geq u, \text{ and } h \times a/b + y \geq v \quad (5)$$

or $$h \times a/b + y \geq u, \text{ and } g \times a/b + x \geq v \quad (6)$$

Next, as illustrated in FIG. 1, in a case of providing the airspace 11 between the flat board 10 and the lens array 3, the visual field of the lenses becomes wider than a case in that the airspace 11 is not provided. The case of providing the airspace 11 will be described.

In FIG. 4A, light rays are illustrated in a case of filling a space between the lenses and the objects with a lens material without an airspace. In FIG. 4B, light rays (solid lines) are illustrated in a case of providing the airspace 11. By an effect of refraction in the airspace 11, a visual field "s" observed in FIG. 4B is wider than a visual field "s'" observed in FIG. 4B. Thus, by providing the airspace 11, it is possible to enlarge the object size available to be picked up, which is determined by adding a visual field of lenses corresponding to an outermost portion of the image surface and the image surface size "x". Moreover, since it is possible to shorten the object distance "a", which ensures the same visual field, from the approximately main flat surface of the lenses to the object, the image input device can be thinner. Furthermore, in a case in that the object distance "a" is set to be constant, an angle of the visual field of each of the lenses forming the lens array 3 can be narrower. Thus, it is possible to suppress deterioration of an image quality.

Next, a process system of the compound eye image picked up by the image pickup device 6 will be described. In the embodiment, the process system includes an image input part 100, a pre-process part 101, a parallax detection process part 103, a single image re-composition process part 104, a correction process part 105, and a PSF pattern storage part 106, as elements associating with an image input. The process system further includes a registration process part 107, a registration data storage part 108, and an authentication process part 109, as elements directly associating with a personal authentication.

The image input part 100 inputs data of the compound eye image picked up by the image pickup device 6. In the following, data of the compound eye image or data of ommatidium image are simply called the compound eye image or ommatidium image.

The pre-process part 101 detects an area corresponding to a shadow of the shielding member 4 in the compound eye image which is input by the image input part 100, and eliminates the shadow area as an invalid area. The shadow area of the shielding member 4 is the darkest, and has a lattice shape. Thus, the shadow area can be easily detected by digitalizing the compound eye image by using an appropriate threshold. A similar pre-process may be conducted in a process of the parallax detection process part 103.

Since the thickness of the skin of the finger 1 differs in individuals, the object distance "a" varies. Even if it is the finger 1 of the same person, the object distance "a" from the object to the flat board 10 varies in cases of pressing the finger 1 stronger to the flat board 10 and lighter to the flat board 10. Associating with this change of the object distance "a", sizes of the observation area 2a and the shared area 2b are changed. Sizes of the observation area 2a and the shared area 2b can be calculated as a relative parallax among adjacent ommatidium images in the compound eye image (or among vicinity ommatidium images).

The parallax detection process part 103 conducts a process for detecting the parallax as described above. First, the parallax detection process part 103 extracts two ommatidium images including the blood vessel pattern from the compound eye image in which the shadow area of the shielding member 4 is eliminated, in order to use for a parallax estimation. Since the blood vessel pattern is dark, the vessel pattern can be easily extracted by digitalizing the ommatidium images. Since a brightness of a shadow portion of the shielding member 4 differs a brightness of the blood vessel pattern, a threshold different from the threshold for digitalizing to eliminate the shadow area of the shielding member 4 can be used for digitalizing the ommatidium images for extraction of the blood vessel pattern. In addition, there is a case in that the brightness is different for each of the ommatidium images. Thus, an average brightness value is calculated for each of the ommatidium images, the average brightness value itself or a value proportional to the average brightness value can be used as the threshold for digitalization. Two ommatidium images for the parallax estimation may not have the shared area 2b if locations of the two ommatidium images are departed from each other. Therefore, it is preferable to extracts two ommatidium images of adjacent lenses. However, if there are no two adjacent ommatidium images including the blood vessel pattern anywhere in the compound eye image, two ommatidium images which are not adjacent to each other may be extracted.

Subsequently, the parallax detection process part 103 conducts the parallax estimation by using the ommatidium images. For example, the parallax detection process part 103 repeats a process of calculating a brightness deviation between one ommatidium image shifted in an x-direction and a y-direction and another ommatidium image (as a reference) and calculating a sum of squares, by gradually changing a shift amount in the x-direction and the y-direction. The parallax is determined in the x-direction and the y-direction by the shift amount in the x-direction and the y-direction when the sum of squares for the brightness deviation becomes least. Alternatively, for example, an estimation process as disclosed at paragraph 0087 and 0093 of Japanese Patent No. 3773563 can be applied to the parallax estimation.

If an error of a lens pitch of the lens array 3 is sufficiently smaller with respect to an estimated parallax, it is possible to calculate the relative parallax for all ommatidium images forming the compound eye image based on the parallax acquired from two ommatidium images by the estimation calculation and a location relationship of ommatidium images regulated by the lens pitch of the lens array 3. In a case of using a etching or a similar process method for processing the lens array 3, a stage carriage error at producing a mask used for the etching affects a lens pitch error of the lens array 3. However, a valid lens area of the lens array 3 is approximately the same as an imaging surface of the image pickup device 6 and is not wide so much as being affected by the stage carriage error. Thus, it can be assumed that a lens pitch error of the lens array 3 is sufficiently small, and there is no problem to estimate a parallax of all ommatidium images based on the estimated parallax among two ommatidium images. In a case in that there is a factor causing a relatively greater pitch error at a lens array process such as inflation and deflation in a plastic molding, one ommatidium image is extracted as a reference ommatidium image, and the above-described parallax estimation calculation is conducted between the reference ommatidium image and all ommatidium images including the blood vessel pattern. In addition, regarding ommatidium images which do not include the blood vessel pattern, the parallax is calculated based on a parallax of the ommatidium images in a near area and the location relationship. Thus, the relative parallax of all ommatidium images is acquired. Without mentioning, the fewer count of the parallax estimation calculations, the shorter is a process time for the parallax detection.

The single image re-composition process part 104 utilizes the parallax among the ommatidium images, which is calculated by the parallax detection process part 103, and conducts a process for re-composing a single image from the compound eye image. For a re-composition of the single image, various well-known methods can be used. For example, a re-composition image space is prepared in a memory. Then, by repeating an operation for re-composing a pixel brightness of the ommatidium image at a location defined by corresponding to a location and the parallax of the omatidium image in the re-composition image space for all pixels for each of the ommatidium images, the single image can be re-composed in the re-composition image space. Alternatively, for example, a super resolution process as disclosed at paragraph 0094 through 00128 of Japanese Patent No. 3773563 can be used. It should be noted that in this super resolution process, a low resolution image is read as the ommatidium image, and a high resolution image is read as the single image re-composed from the compound eye image. In the super resolution process, a frequency component exceeding the Nyquist frequency of the image pickup device 6 is reproduced in the low resolution image by using a plurality of the low resolution images and their relative parallaxes. Thus, it is possible to re-compose the single image in which the resolution is improved, by forming a compound eye by the lens array 3, that is, by reducing the optical magnification accompanying with making an optical system thinner.

It should be noted that the method disclosed in Japanese Patent No. 3773563 detects a relative location displacement between the object and a camera and re-composes an image by using the relative location displacement in a surface orthogonal to an optical system in a plurality of images acquired by the optical system being monocular. In a case of applying to the present invention, the plurality of ommatidium images forming the compound eye image by using the lens array 3 is handled as individual images. The ommatidium image formed by each of lenses of the lens array 3 has a location relationship different from the object and has a relative displacement. Accordingly, the plurality of the ommatidium images can be handled similar to the plurality of images acquired in the method disclosed in Japanese Patent No. 3773563. Moreover, in Japanese Patent No. 3773563, a case in that the parallax is smaller than one pixel of an image pickup device is explained. In the present invention, since the object is placed adjacent to an imaging optical system, the parallax among adjacent ommatidium images becomes greater than one pixel. That is, there may be pixels which do not share an object image among the adjacent ommatidium images. In Japanese Patent No. 3773563, it is assumed that all pixels of the plurality of images share the object image. Accordingly, since a noise occurs for pixels which do not share the object image, it is required to determine the pixels which do not share the object image by using the estimated parallax, and it is required to suppress a broadband interpolation and a weighting calculation for the pixels which do not share the object image.

In a case in that the parallax becomes greater and an area sharing the object image among ommatidium images becomes smaller, instead of prospecting a super resolution effect, a connection process (described below) of ommatidium images is conducted. Alternatively, the super resolution process and the connection process are selectively conducted based on a size of the estimated parallax. Compared to a case of fully applying a medium resolution process, it is possible to reduce a memory area and a calculation time.

Figure 5:
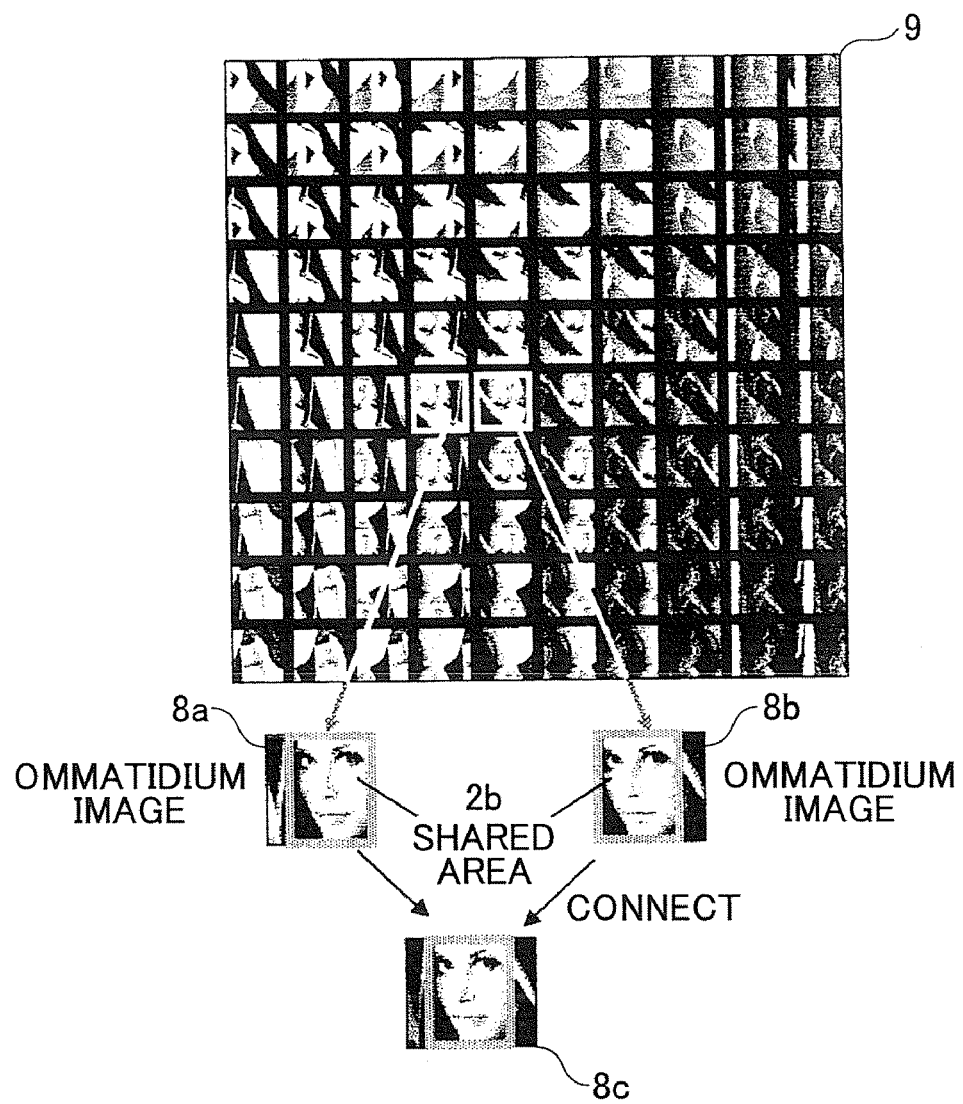
FIG. 5 is a diagram for explaining a connection process of ommatidium images.

As illustrated in FIG. 5, the connection process of the ommatidium images is a process for connecting the ommatidium images by overlapping the shared area 2b being shared by adjacent ommatidium images. In FIG. 5, two ommatidium images 8a and 8b are extracted from a compound eye image 9 and are flipped vertically and horizontally. Each area surrounded with a square in the ommatidium images 8a and 8b is the shared area 2b. The ommatidium images 8a and 8b are connected so that the shared areas 2b in the ommatidium images 8a and 8b are overlapped and corresponded to each other. Then, a connected image 8c is formed.

In detail, since the shared area 2b varies depending on the object distance "a" in the adjacent ommatidium images, the shared area 2b in the adjacent ommatidium images is calculated by using the detected parallax or the object distance "a" calculated from the parallax. In two adjacent ommatidium images, by setting the shared area 2b in one ommatidium image to be valid and setting the shared area 2b in another ommatidium image to be invalid, valid areas are connected. All valid areas of the ommatidium images are connected to re-compose the single image of the object.

In order to prospect the super resolution process effect, it is required to eliminate a band restriction of a low pass filter, a cutoff frequency of each of the lenses forming the lens array 3, or a like, which is mounted to an image pickup device. Thus, as described above, the image pickup device 6, which does not mount the low pass filter, is used. Moreover, it is required to design an optical system so that the cutoff frequency becomes higher than a space frequency (higher than the Nyquist frequency of the image pickup device 6), which is targeted in the image input device. On the other hand, this consideration is not required if the super resolution effect is not prospected.

The optical system, which is made to be thinner by using the lens array 3, has a lower flexibility of a design due to a shorter focal length and a fewer surfaces. Moreover, as described in the embodiment of the present invention which is applied to pick up an image of the blood vessel pattern of the finger 1 for the personal authentication, in a case in that the object distance "a" is shorter and varies, it is generally difficult to acquire a image in a state of suppressing distortion and defocus across the entire ommatidium images. If a single image is re-composed from ommatidium images including distortion and a like, a discontinuous portion may occur and deteriorate an image quality.

In order to suppress an image distortion and a difference of an MTF due to an incident angle of light rays coming into lenses, and correct deterioration of the MTF due to the difference suppression, it is preferable to store a PSF pattern acquired beforehand at a design stage of the optical system or at an evaluation or test stage after a device production by considering a production error of the optical system, and to conduct a deconvolution operation using the PSF pattern for each of the ommatidium images prior to the re-composition or a single image which is re-composed. Accordingly, it is possible to suppress the distortion and the defocus across the entire ommatidium images or the entire single image being re-composed. In a case in that the difference of the MTF is not fully suppressed, it is preferable to acquire and store a PSF pattern for each object distance "a", each parallax, or each incident angle of the light rays, and to conduct the deconvolution operation using the PSF pattern corresponding to the object distance "a", the parallax, or the incident angle of the light rays. The deconvolution operation may be conducted for each of the ommatidium images before the re-composition or for the signal image after the re-composition. In a case of conducting the deconvolution operation for each of the ommatidium images, a PSF pattern, in which the band restriction is properly performed in the Nyquist frequency of the image pickup device 6, is used. In a case of conducting the convolution operation for a re-composed image, a PSF pattern, in which the band restriction is properly performed for a band being widen by the super resolution process.

The correction process part 105 conducts a correction by the above-described convolution operation. The PSF pattern stored in the PSF pattern storage part 106 is used for the correction. In the embodiment, a plurality of PSF patterns corresponding to different parallaxes are stored in the PSF pattern storage part 106. The PSF pattern corresponding to the parallax detected by the parallax detection process part 103 is read out from the PSF pattern storage part 106 and is used by the correction process part 105.

There is a case of deteriorating an image quality of the re-composed image, since distortion is increased in each of ommatidium images forming the compound eye image or a peripheral light amount of each of the ommatidium images is decreased, depending on the object size and the thickness of the image input device which are required. However, since the distortion and the decrease of the peripheral light amount can be estimated, it is possible to correct an image by using the estimated values. In this case, at a stage of the compound eye image, the compound eye image may be generated from the ommatidium images, which approximately become normal by correcting the distortion and the peripheral light amount of each of the omatidium images, and the single image may be re-composed from the corrected ommatidium images. In fact, the distortion and the peripheral light amount become problems and the above-described approach can be corrected in a case of observing a wider visual field of the object by using a regular monocular optical system accompanying with reducing the size of the image input device. When it attempts to correct the same amount of the distortion and the same peripheral light amount by the monocular optical system and one lens forming the lens array, the image input device according to the present invention can realize to reduce the size of the device much more than the case of using the monocular optical system.

In the embodiment, as an operation mode, a mode for registering personal data for a personal authentication and a mode for conducting the personal authentication can be selectively conducted.

When the mode for registering the personal data is selected, a person attempting to register the personal data contacts the flat board 10 with a finger. The blood vessel pattern of the finger is picked up and the compound eye image is input to the image input part 100. After the above-described process is conducted, the correction process part 105 outputs a single image of the blood vessel pattern in which the distortion is corrected. The registration process part 107 stores the whole single image as the personal data to the registration data storage part 108. Alternatively, the registration process part 107 extracts feature information such as information indicating a branch point coordinates of a blood vessel pathway or a like from the single image, and stores the feature information as the personal data to the registration data storage part 108.

When the personal authentication mode is selected, a person attempting to be authenticated contacts the flat board 10 with a finger. The blood vessel pattern of the finger is picked up and the compound eye image is input to the image input part 100. After the above-described process is conducted, the correction process part 105 outputs a single image of the blood vessel pattern in which the distortion is corrected. The authentication process part 109 verifies the single image with the personal data stored in the registration data storage part 108. In a case in that the personal data are stored as the whole single image of the object, a pattern matching operation may be conducted to verify the single image output from the correction process part 105. Alternatively, the authentication process part 109 may extract respective feature information such as the branch point coordinates of the blood vessel pathway from both the input single image and the stored single image as the personal data, and may verify the person by mutually comparing the respective feature information. In a case of registering the feature information of the branch point coordinates or the like as the personal data, the authentication process part 109 may similarly extract feature information from the input single image, and may verify the person by mutually comparing respective feature information. Subsequently, the authentication process part 109 outputs information indicating a successful authentication when the feature information from the input single image corresponds to the personal data stored in the registration data storage part 108. The authentication process part 109 outputs information indicating an authentication failure when the feature information from the input single image does not correspond to the personal data stored in the registration data storage part 108. In a case of using the feature information of the branch point coordinates or the like of the blood vessel pathway in the authentication process, a feature extraction process part is required but there is an advantage of reducing a data amount to store in the registration data storage part 108.

A resolution of the object is indicated by a product of the Nyquist frequency of an image pickup device and an optical magnification at an object location. The object distance varies since a skin thickness differs in individuals. The optical magnification is degraded depending on a longer object distance, and the resolution is deteriorated. Accompanying with the deterioration of the resolution, it becomes difficult to acquire a valid blood vessel pattern and an accuracy of the authentication is degraded. Then, ease of the authentication varies in individuals. This difference in individuals can be compensated by the above-described super resolution process using a relative parallax among ommatidium images being smaller (a sampling becomes a high density) in that the object distance becomes longer. Therefore, it is possible to suppress a change of the resolution accompanying with the object distance.

Figure 6A:
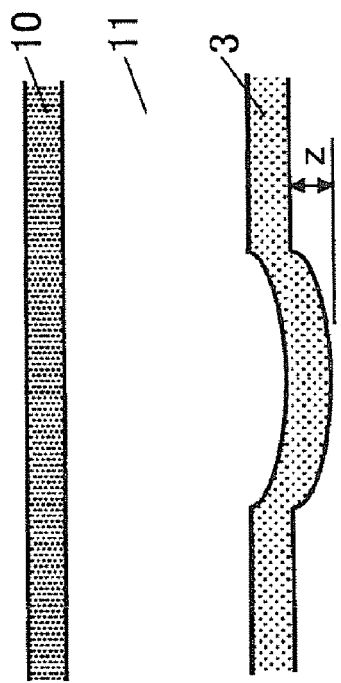
FIG. 6 is a diagram for explaining a configuration of the lens array to ensure a wider visual field, instead of having a stronger power on a lens surface.

The lenses forming the lens array 3 will be described with reference to FIG. 6A and FIG. 6B. In a case of the lens array 3 illustrated in FIG. 1, the lens array 3 is configured to have a lens surface at one side as illustrated in FIG. 6A.

Figure 6B:
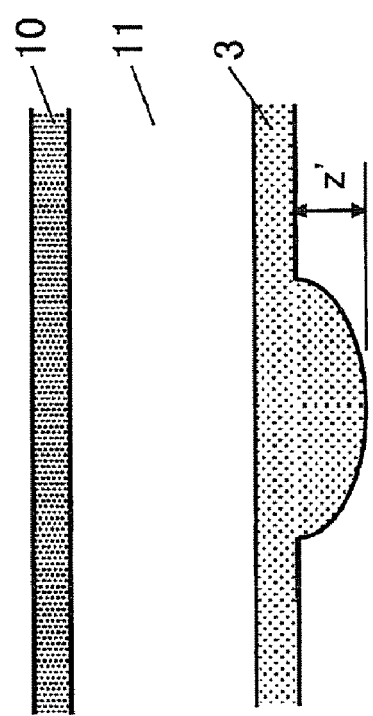

According to an aspect of the present invention, as illustrated in FIG. 6B, the lens array 3 is configured that a lens formed at a side of the object and a lens formed on an image pickup surface are paired and both lens are formed to have a negative power toward the object. A greater power is required to a lens to be thinner. Thus, a sag amount becomes greater. A process is difficult for a surface having a great sag amount and a steep surface. In a configuration illustrated in FIG. 6B, power of a lens surface can be dispersed into two, and a curvature of the lens surface can be reduced. Therefore, since a sag amount "z" of the lens illustrated in FIG. 6B can be less than a sag amount "z'" of the lens of the configuration illustrated in FIG. 6A, it is possible to easily process the lens and it is beneficial for a molding process or a like using a mold.

It is beneficial to realize the pre-process part 101, the parallax detection process part 103, the single image re-composition process part 104, the correction process part 105, the registration process part 107, and the authentication process part 109 by hardware if a high speed performance is concerned. On the other hand, for a notebook personal computer and an personal authentication device to be mounted in an information device in which a micro-computer is internally mounted, it is beneficial to realize the entire or a part of these process parts by software if costs are concerned.

Accordingly, the present invention can realize an image input device which can pick up an image of an object on an area wider than the image surface of an image pickup part by using a thin-type optical system with respect to the object significantly closed to the image pickup part, and can input the image. For example, in an application for a personal authentication inputting a vein pattern of a finger, a general and inexpensive image pickup device, in which an image surface size is not wider, can be used, and a device cost can be reduced.

In the image input device, by providing a gas, such as the air or the like, or liquid layer, or a vacuum layer between a lens array and a transparent flat board member, compared to filling a space corresponding to this layer with the flat board member or the lens array, it is possible to further reduce a volume of the flat board member or the lens array and further reduce a material cost for the flat board member or the lens array. In addition, it is possible to enlarge a visual field range by refraction at borders between the layer and the lens array and between the layer and the flat board member.

In the image input device, based on a height of the shielding member in a lens optical axis direction, an image surface distance "b" (a distance from an approximately main flat surface of each lens of the lens array) can be determined, and a crosstalk of light rays can be prevented in a surface in a direction parallel to the image surface.

In the image input device, an image can be picked up with a wider visual field in reducing an optical magnification due to a shorter back focus of lenses. On the other hand, a stronger power is required for the lenses. As a result, it becomes difficult to process a surface having the stronger power and being steep. In response to this difficulty, in the image input device, power of lenses of the lens array can be dispersed into two. Accordingly, it is possible to reduce power of a lens surface of each lens. A lens shape is relatively easily processed in a resin formation, and the wider visual field can be ensured. Moreover, by configuring to have the negative power in the objection direction at both surfaces, it is possible to suppress differences of an image formation location and enlargement based on an incident angle of the light rays to the lenses. Therefore, it is possible to input an image in which distortion of the image is suppressed even if the visual field is enlarged.

In the image input device, the object is imaged in a state of illuminating light such as near-infrared light to the living body. Therefore, it is possible to further improve a contrast and to input the object image having a higher the S/N ratio.

According to the present invention, it is possible to realize a personal authentication device which conducts a personal authentication at a higher accuracy by using a blood vessel pattern image of a finger or a like and which is a thinner and minimized at a lower cost.

As described above, according to the present invention, a preferable personal authentication device being a thinner and minimized can be realized as an image input part of a personal authentication device at a lower cost. Also, by using the image input device, it is possible to realize the personal authentication device being a thinner and minimized and having a higher authentication accuracy at a lower cost.

The present invention is not limited to the specifically disclosed embodiments, and variations and modifications may be made without departing from the scope of the invention.

The present application is based on the Japanese Priority Patent Applications No. 2007-239581 filed Sep. 14, 2007 and No. 2008-211087 filed Aug. 19, 2008, the entire contents of which are hereby incorporated by reference.

What is claimed is:

1. An image input device, comprising:
a lens array in which a plurality of lenses are arrayed;
a shielding member configured to prevent a crosstalk on an image surface of light rays passing each of lenses of the lens array;
a flat board member configured to regulate a position of a living body in a lens optical axis direction of the lens array when contacting the living body;
an image pickup part configured to include an image surface and pick up a compound eye image, which is a set of reduced images of an object inside the living body which position is regulated by the flat board member, the reduced images approximately formed on the image surface by the plurality of lenses of the lens array; and
a process part configured to re-compose a single image from the compound eye image picked up by the image pickup part,
wherein the single image re-composed by the process part is input as an object image, and
wherein the shielding member is arranged between the lens array and the image surface and includes rectangle apertures respective to the plurality of lenses of the lens array, such that when a size of each of the rectangle apertures is denoted by g×h (g and h denote respective lengths of edges of a cross-sectional surface of the rectangular aperture in a surface approximately orthogonal to a lens optical axis of the lens array), a distance from an approximately main surface of each lens of the lens array to the object is denoted by a, a distance from the approximately main surface of each lens of the lens array to the image surface is denoted by b, a size of the image surface is denoted by x×y (x and y denote respective lengths of edges of the image surface which is rectangle), and a size of a visual field at the position of the object is denoted by u×v (u and v are respective lengths of edges of the visual field which is rectangle), a relationship (i) or a relationship (ii) is satisfied:

$$g \times a/b + x \geq u, \text{ and } h \times a/b + y \geq v \quad (i)$$

or $$h \times a/b + y \geq u, \text{ and } g \times a/b + x \geq v \quad (ii).$$

2. The image input device as claimed in claim 1, wherein a layer of gas or liquid is provided between the flat board member and the lens array.

3. The image input device as claimed in claim 2, wherein the layer is airspace.

4. The image input device as claimed in claim 1, wherein a vacuum layer is provided between the flat board member and the lens array.

5. The image input device as claimed in claim 1, wherein a height of the shielding member in the lens optical axis direction is approximately corresponded to the distance b.

6. The image input device as claimed in claim 1, further comprising a light source illuminating light to the living body contacting the flat board member,
wherein the flat board member includes transmittance with respect to the light emitted from the light source.

7. A personal authentication device, comprising:
an image input device; and
an authentication process part configured to conduct an authentication process by using an object image input from the image input device,
wherein the image input device comprises:
a lens array in which a plurality of lenses are arrayed;
a shielding member configured to prevent a crosstalk on an image surface of light rays passing each of lenses of the lens array;
a flat board member configured to regulate a position of a living body in a lens optical axis direction of the lens array when contacting the living body;
an image pickup part configured to include an image surface and pick up a compound eye image, which is a set of reduced images of an object inside the living body which position is regulated by the flat board member, the reduced images approximately formed on the image surface by the plurality of lenses of the lens array; and
a process part configured to re-compose a single image from the compound eye image picked up by the image pickup part,
wherein the single image re-composed by the process part is input as the object image, and
wherein the shielding member is arranged between the lens array and the image surface and includes rectangle apertures respective to the plurality of lenses of the lens array, when a size of each of the rectangle apertures is denoted by g×h (g and h denote respective lengths of a cross-sectional surface of the rectangular aperture in a surface approximately orthogonal to a lens optical axis of the lens array), a distance from an approximately main surface of each lens of the lens array to the object is denoted by a, a distance from the approximately main surface of each lens of the lens array to the image surface is denoted by b, a size of the image surface is denoted by x×y (x and y denote respective lengths of edges of the image surface which is rectangle), and a size of a visual field at the position of the object is denoted by u×v (u and v are respective lengths of edges of the visual field which is rectangle), a relationship (i) or a relationship (ii) is satisfied:

$$g \times a/b + x \geq u, \text{ and } h \times a/b + y \geq v \quad (i)$$

or $$h \times a/b + y \geq u, \text{ and } g \times a/b + x \geq v \quad (ii).$$

* * * * *